(12) United States Patent
Ravindran et al.

(10) Patent No.: US 11,576,006 B2
(45) Date of Patent: Feb. 7, 2023

(54) INFRASTRUCTURE-LESS INDOOR NAVIGATION IN A FIRE CONTROL SYSTEM

(71) Applicant: Honeywell International Inc., Charlotte, NC (US)

(72) Inventors: Vanathi Ravindran, Bangalore (IN); Kamalraja Ganesan, Chennai (IN); Prashant Pathak, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/992,816

(22) Filed: Aug. 13, 2020

(65) Prior Publication Data
US 2020/0374657 A1 Nov. 26, 2020

Related U.S. Application Data

(63) Continuation of application No. 16/393,207, filed on Apr. 24, 2019, now Pat. No. 10,750,321.

(51) Int. Cl.
*G08B 29/02* (2006.01)
*H04W 4/024* (2018.01)
(Continued)

(52) U.S. Cl.
CPC .......... *H04W 4/024* (2018.02); *G08B 29/043* (2013.01); *H04W 4/33* (2018.02)

(58) Field of Classification Search
CPC .... G08B 29/145; G08B 17/00; G08B 17/103; G08B 17/113; G08B 25/10; G08B 7/066; G08B 17/10; G08B 7/062; G08B 25/003; G08B 25/14; G08B 29/043; G08B 7/064; G08B 13/1966; G08B 13/19695; G08B 13/22; G08B 17/06; G08B 21/12; G08B 25/00; G08B 25/009; G08B 25/016; G08B 25/06; G08B 25/08; G08B 25/085; G08B 27/00; G08B 27/001; H04W 4/024;
(Continued)

(56) References Cited

U.S. PATENT DOCUMENTS 6,518,878 B1   2/2003   Skoff
6,737,967 B2 *  5/2004   Farley ................. G08B 29/145
                                                340/506
(Continued)

*Primary Examiner* — Daniel Previl
(74) *Attorney, Agent, or Firm* — Brooks, Cameron & Huebsch, PLLC

(57) ABSTRACT

Devices, methods, and systems for infrastructure-less indoor navigation in a fire control system are described herein. One device includes a non-transitory computer readable medium having computer readable instructions stored thereon that are executable by a processor to receive a location of each of a plurality of smoke detectors of a facility, display the location of each of the plurality of smoke detectors in a building information model (BIM) on a user interface, wherein each respective one of the displayed plurality of smoke detectors represents a different smoke detector of the plurality of smoke detectors of the facility, receive a selection of a first displayed smoke detector of the plurality of displayed smoke detectors representing a first smoke detector of the plurality of smoke detectors of the facility, and guide a user to the location of the first smoke detector of the facility responsive to receiving the selection.

20 Claims, 3 Drawing Sheets

(51) Int. Cl.
*H04W 4/33* (2018.01)
*G08B 29/04* (2006.01)

(58) Field of Classification Search
CPC ........ H04W 4/029; H04W 4/33; Y02E 30/00;
Y02E 30/30; A62C 2/16; F24F 11/35;
F24F 13/10; F24F 2013/144; F24F
2013/146; G06K 9/00288; G06K
9/00369; G06K 9/00771; G06Q 90/205;
Y02A 10/40

USPC ......... 340/506, 507, 539.22, 539.26, 539.27,
340/577, 691.6, 3.43–3.44, 286.05,
340/815.56
See application file for complete search history.

(56) References Cited

U.S. PATENT DOCUMENTS

| | | | |
|---|---|---|---|
| 8,225,908 B1* | 7/2012 | Schmutter | B66B 5/027 |
| | | | 187/247 |
| 9,342,928 B2 | 5/2016 | Rasane et al. | |
| 9,525,976 B2 | 12/2016 | Dharwada et al. | |
| 2009/0307255 A1 | 12/2009 | Park | |
| 2011/0218777 A1 | 9/2011 | Chen et al. | |
| 2013/0282280 A1* | 10/2013 | Patterson | G08B 7/062 |
| | | | 701/533 |
| 2014/0132409 A1 | 5/2014 | Billman et al. | |
| 2015/0065078 A1* | 3/2015 | Mejia | H04M 11/04 |
| | | | 455/404.1 |
| 2016/0018226 A1* | 1/2016 | Plocher | A62B 3/00 |
| | | | 701/428 |
| 2016/0147211 A1* | 5/2016 | Kore | H04W 4/80 |
| | | | 700/83 |
| 2016/0225241 A1* | 8/2016 | Jones, Jr. | G08B 19/005 |
| 2016/0247369 A1* | 8/2016 | Simmons | G08B 7/062 |
| 2016/0298950 A1* | 10/2016 | Modi | G06V 20/20 |

* cited by examiner

INFRASTRUCTURE-LESS INDOOR NAVIGATION IN A FIRE CONTROL SYSTEM

PRIORITY INFORMATION

This application is a Continuation of U.S. application Ser. No. 16/393,207, filed Apr. 24, 2019, the contents of which are incorporated herein by reference.

TECHNICAL FIELD

The present disclosure relates generally to devices, methods, and systems for infrastructure-less indoor navigation in a fire control system.

BACKGROUND

Large facilities (e.g., buildings), such as commercial facilities, office buildings, hospitals, and the like, may have a fire control system that can be triggered during an emergency situation (e.g., a fire) to warn occupants to evacuate. For example, a fire control system may include a fire control panel and a plurality of smoke detectors, located throughout the facility (e.g., on different floors and/or in different rooms of the facility) that can sense a fire occurring in the facility and provide a notification of the fire to the occupants of the facility via alarms.

Maintaining the fire control system can include locating and fixing issues generated by the smoke detectors. Typically, a maintenance engineer can determine smoke detector faults at the fire control panel. The maintenance engineer can write down which smoke detectors have faults and the addresses of each smoke detector to carry with him. The maintenance engineer can use the addresses along with a floor plan of the facility to find each smoke detector with a fault. In some examples, the addresses may not be correct and/or accurate enough to provide an exact location of the smoke detector. As such, the maintenance engineer may need to check a plurality of smoke detectors within an area to identify the device with the fault.

After the maintenance engineer has identified the faulty smoke detector and believes the fault has been fixed, the maintenance engineer goes back to the fire control panel to confirm whether the fault has been cleared. If the fault has not been fixed, the maintenance engineer goes back to the smoke detector to try to fix the fault again. This process of fixing the fault and confirming that the fault has been fixed at the fire control panel can be time consuming.

DETAILED DESCRIPTION

Figure 1:
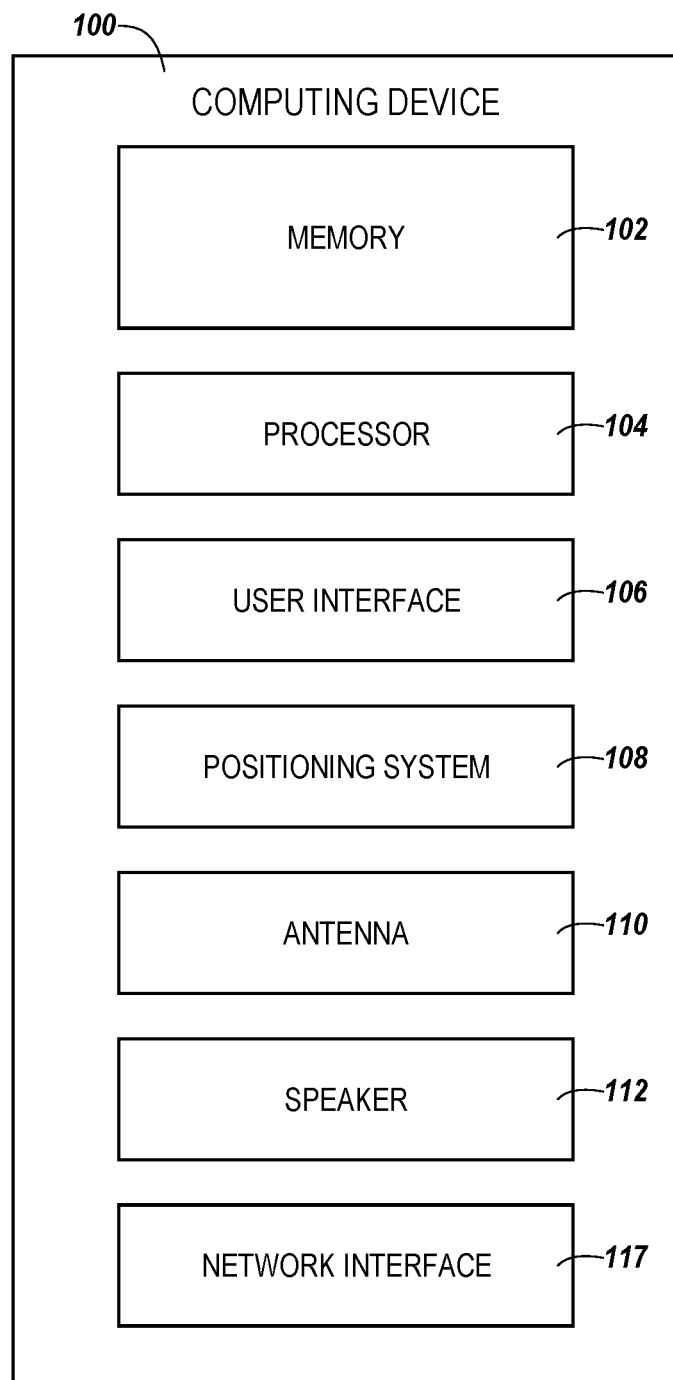
FIG. 1 illustrates an example of a computing device for guiding a user to a smoke detector of a fire control system in accordance with an embodiment of the present disclosure.

Devices, methods, and systems for infrastructure-less indoor navigation in a fire control system are described herein. One device includes a non-transitory computer readable medium having computer readable instructions stored thereon that are executable by a processor to receive a location of each of a plurality of smoke detectors of a facility, display the location of each of the plurality of smoke detectors in a building information model (BIM) on a user interface, wherein each respective one of the displayed plurality of smoke detectors represents a different smoke detector of the plurality of smoke detectors of the facility, receive a selection of a first displayed smoke detector of the plurality of displayed smoke detectors representing a first smoke detector of the plurality of smoke detectors of the facility, and guide a user to the location of the first smoke detector of the facility responsive to receiving the selection.

In contrast to previous fire control systems in which a maintenance engineer would have to go to a fire control panel to find out which smoke detectors had faults, where the smoke detectors were located, and confirm whether they had fixed the fault, fire control systems in accordance with the present disclosure allow for the maintenance engineer to see the status of each of the plurality of smoke detectors, guide the user to any of the plurality of smoke detectors, and confirm whether the maintenance engineer fixed the fault without going and/or going back to the control panel using infrastructure-less indoor navigation (e.g., without going back and forth between a fire control panel and a smoke detector). Accordingly, fire control systems in accordance with the present disclosure may take significantly less time to maintain.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designators "X", "Y", and "Z" as used herein, particularly with respect to reference numerals in the drawings, indicate that a number of the particular feature so designated can be included with some embodiments of the present disclosure. This number may be the same or different between designations.

FIG. 1 illustrates an example of a computing device 100 for guiding a user to a smoke detector of a fire control system in accordance with an embodiment of the present disclosure. The fire control system can be the fire control system of a facility (e.g., building), such as, for instance, a large facility having a large number of floors, such as a commercial facility, office building, hospital, and the like. However, embodiments of the present disclosure are not limited to a particular type of facility.

The computing device 100 for guiding a user to a smoke detector can be, refer to, and/or include a laptop computer, desktop computer, or mobile device, such as, for instance, a smart phone or tablet, among other types of computing devices. However, embodiments of the present disclosure are not limited to a particular type of computing device. Computing device 100 may be located at the facility, such as, for instance, in a control room or operating room of the facility or may be located remotely from the facility.

The fire control system can be used during an emergency situation (e.g., a fire) to warn occupants to evacuate. For example, the fire control system may include a fire control panel and a plurality of smoke detectors, located throughout the facility (e.g., on different floors and/or in different rooms of the facility) that can sense a fire occurring in the facility and provide a notification of the fire to the occupants of the facility via alarms.

Computing device 100 can receive a building information model (BIM) of the facility, a location of each of a plurality of smoke detectors of the facility, and a status of each of the plurality of smoke detectors via a wired or wireless network. The network can be a network relationship through which computing device 100 can communicate with the control panel and/or a server of the smoke control system. The control panel can also use the network to communicate with the server and/or the plurality of smoke detectors. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to, computing device 100 and the components of the smoke control system via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

As shown in FIG. 1, computing device 100 can include a memory 102 and a processor 104. Memory 102 can be any type of storage medium that can be accessed by processor 104 to perform various examples of the present disclosure. For example, memory 102 can be a non-transitory computer readable medium having computer readable instructions (e.g., computer program instructions) stored thereon that are executable by processor 104 to guide a user to a smoke detector in accordance with the present disclosure. That is, processor 104 can execute the executable instructions stored in memory 102 to receive a location of each of a plurality of smoke detectors of a, display the locations of the plurality of smoke detectors in a building information model (BIM) on a user interface, receive a selection of a displayed smoke detector of the plurality of displayed smoke detectors representing a smoke detector of the plurality of smoke detectors of the facility, and guide a user to the location of the smoke detector of the facility responsive to receiving the selection.

In some embodiments, memory 102 can store the BIM and a status and a location of each of the plurality of smoke detectors. The BIM and the status and location of each of the plurality of smoke detectors can be received via an antenna 110 and/or network interface 117 from a control panel and/or a server. In some examples, the status of each of the plurality of smoke detectors of the facility can be received from the control panel via a near-field communication (NFC) antenna and the location of each of the plurality of smoke detectors of the facility can be received via the network interface 117, which will be further described in connection with FIG. 2. The BIM and the status and location of each of the plurality of smoke detectors can be received in response to a command, periodically, and/or upon detecting a change in the BIM, a change in status of a smoke detector and/or a change in location of a smoke detector, for example.

The BIM can include building information including space and fixture information to define a plurality of spaces of the building. For example, the BIM can be a digital building floor plan. In some examples, the BIM can be downloaded to the computing device 100.

Each of the plurality of smoke detectors can have a status. For example, a smoke detector can have a properly functioning status, a faulty status, a triggered status, or a disabled status. A smoke detector can have a properly functioning status in response to the smoke detector operating without any faults. When there are errors, for example inaccurate sensor readings, a smoke detector can have a faulty status. A smoke detector can have a triggered status in response to the smoke detector sounding an alarm. When a smoke detector has a disabled status, the smoke detector can be turned off, without power, and/or not transmitting a signal, for example.

The location of each of the plurality of smoke detectors can be marked via latitude and longitude coordinates. The locations of each of the plurality of smoke detectors can be transmitted from each of the plurality of smoke detectors to the server and/or control panel in response to a command. In some examples, the location of each of the plurality of smoke detectors can be manually entered and stored in memory of the server and/or control panel.

The computing device 100 can include a user interface 106. In some embodiments, the user interface 106 can display the location of each of the plurality of smoke detectors. The location of each of the plurality of smoke detectors can be displayed in the BIM, for example. Each respective one of the displayed plurality of smoke detectors can represent a different smoke detector of the plurality of smoke detectors of the facility.

In some embodiments, the user interface 106 can be configured to receive selections. For example, a user can select a displayed smoke detector on the user interface 106. The user interface 106 can guide (e.g., navigate) the user to the location of the smoke detector of the facility represented by the selected smoke detector responsive to receiving the selection. The user interface 106 can guide the user from the location of the fire control panel and/or the user's current position to the location of the smoke detector of the facility.

The user interface 106 can guide the user to the location of the smoke detector of the facility by displaying directions and/or displaying a route on user interface 106. In some examples, the computing device 100 can include a speaker 112 to broadcast directions instead of or in parallel with the user interface 106 displaying directions and/or displaying a route.

In some examples, the user interface 106 can display data corresponding to the smoke detector of the facility represented by the selected smoke detector. The displayed data can include what zone the smoke detector is in, battery life, link strength, smoke detector sensitivity, smoke detector readings, and the status of the smoke detector, for example.

The user interface 106 can display a smoke detector with a particular symbol, in a particular shade or color, and/or highlighted based on the status of the corresponding smoke detector of the facility. For example, a displayed smoke detector can be highlighted responsive to the corresponding smoke detector of the facility having a faulty status. In some examples, the user interface 106 can display a smoke detector in a first color responsive to the smoke detector of the facility having a properly functioning status, a second color responsive to the smoke detector of the facility having a faulty status, a third color responsive to the smoke detector of the facility having a triggered status, and a fourth color responsive to the smoke detector of the facility having a disabled status.

The particular symbol, particular shade or color, and/or highlight of the displayed smoke detector on the user interface 106 can change responsive to the status of the corresponding smoke detector of the facility changing. For example, the user interface 106 can be configured to change the smoke detector from a first color to a second color responsive to the corresponding smoke detector of the facility going from a faulty status to a properly functioning status.

In some embodiments, the computing device 100 can include a positioning system 108. The positioning system 108 can operate in environments where a global positioning system (GPS) is unavailable or unreliable. These environments, for example inside a facility, can be referred to herein as GPS denied environments. The positioning system 108 can include geomagnetic positioning and/or inertial positioning to guide a user to a location of a smoke detector.

Figure 2:
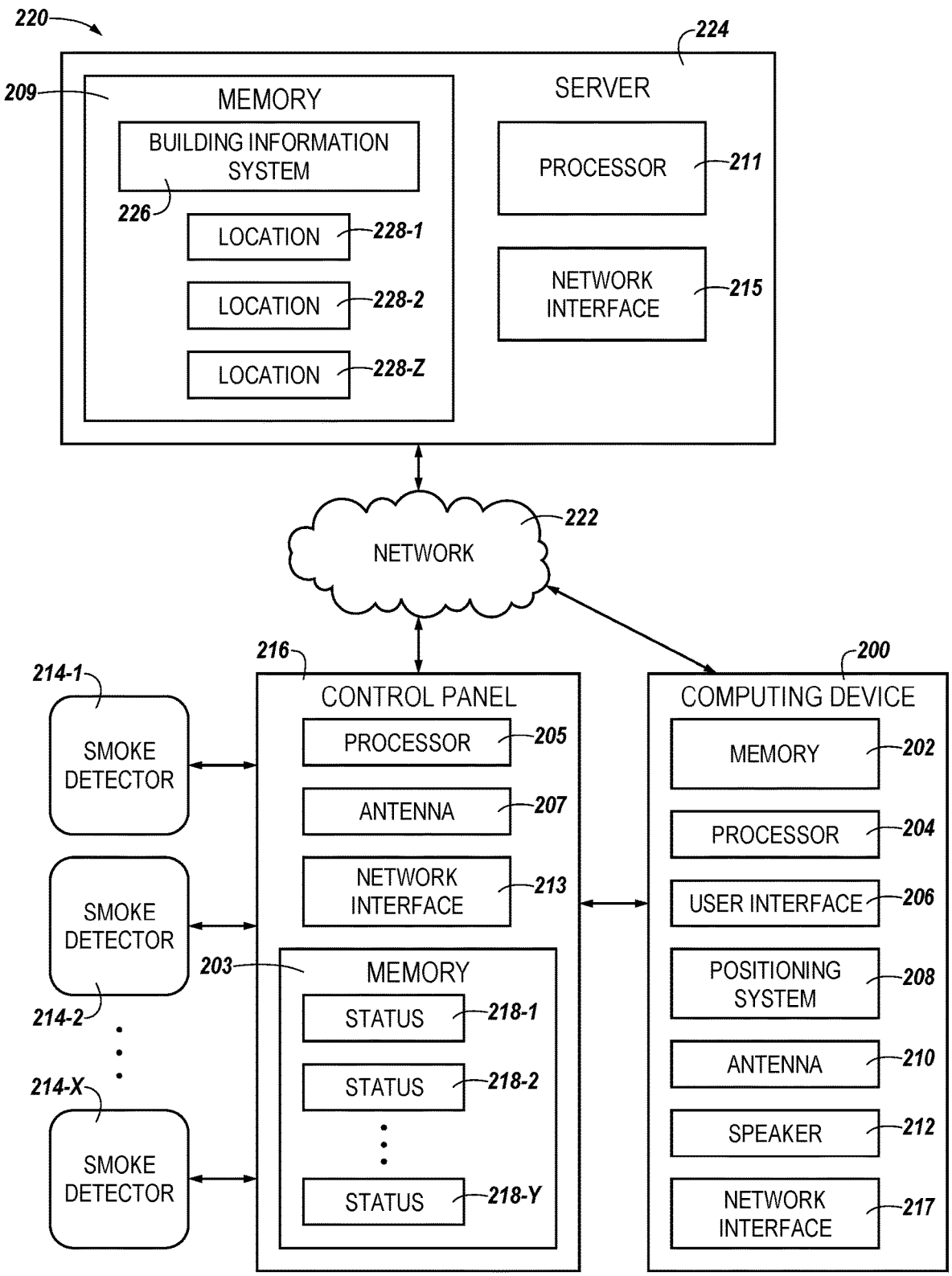
FIG. 2 illustrates an example of a fire control system in accordance with an embodiment of the present disclosure.

FIG. 2 illustrates an example of a fire control system 220 in accordance with an embodiment of the present disclosure. The fire control system 220 can include a plurality of smoke detectors 214-1, 214-2, . . . , 214-X, a control panel 216, a network 222, a server 224, and a computing device 200. The computing device 200 can be analogous to the computing device 100 previously described in connection with FIG. 1.

The plurality of smoke detectors 214-1, 214-2, . . . , 214-X, can be located throughout a facility (e.g., on different floors and/or in different rooms of the facility). The smoke detectors 214-1, 214-2, . . . , 214-X can sense a fire occurring in the facility. In some examples, the smoke detector 214-1, 214-2, . . . , 214-X can include or be coupled to an alarm to provide a notification of the fire to the occupants of the facility.

As shown in FIG. 2, the plurality of smoke detectors 214-1, 214-2, . . . , 214-X can be coupled to the control panel 216. The plurality of smoke detectors 214-1, 214-2, . . . , 214-X can transmit a status 218-1, 218-2, . . . , 218-Y and location 228-1, 228-2, . . . , 228-Z of each of the plurality of smoke detectors 214-1, 214-2, . . . , 214-X to the control panel 216. The plurality of smoke detectors 214-1, 214-2, . . . , 214-X can transmit the status 218-1, 218-2, . . . , 218-Y and/or location 228-1, 228-2, . . . , 228-Z of each of the plurality of smoke detectors 214-1, 214-2, . . . , 214-X periodically, upon detecting a change in status 218-1, 218-2, . . . , 218-Y and/or a change in location 228-1, 228-2, . . . , 228-Z, and/or upon receiving a command to transmit a status 218-1, 218-2, . . . , 218-Y and/or location 228-1, 228-2, . . . , 228-Z from the control panel 216.

The control panel 216 can be a box installed in the facility that can include a memory 203, a processor 205 and an antenna 207, and a network interface 213. The memory 203 can store the status 218-1, 218-2, . . . , 218-Y of each of the plurality of smoke detectors 214-1, 214-2, . . . , 214-X. For example, smoke detector 214-1 can have a properly functioning status, a faulty status, a triggered status, or a disabled status. Smoke detector 214-1 can have a properly functioning status responsive to smoke detector 214-1 operating without any faults. When there are errors, for example inaccurate sensor readings, smoke detector 214-1 can have a faulty status. Smoke detector 214-1 can have a triggered status responsive to smoke detector 214-1 sounding an alarm. When smoke detector 214-1 has a disabled status, smoke detector 214-1 can be turned off, without power, and/or not transmitting a signal, for example.

Memory 203 can be any type of storage medium that can be accessed by processor 205 to perform various examples of the present disclosure. For example, memory 203 can be a non-transitory computer readable medium having computer readable instructions (e.g., computer program instructions) stored thereon that are executable by processor 205 to send a command to the plurality of smoke detectors 214-1, 214-2, . . . , 214-X to request a status 218-1, 218-2, . . . , 218-Y and/or a location 228-1, 228-2, . . . , 228-Z of each of the plurality of smoke detectors 214-1, 214-2, . . . , 214-X, receive the status 218-1, 218-2, . . . , 218-Y and/or location 228-1, 228-2, . . . , 228-Z of each of the plurality of smoke detectors 214-1, 214-2, . . . , 214-X, and transmit the status 218-1, 218-2, . . . , 218-Y and/or location 228-1, 228-2, . . . , 228-Z of each of the plurality of smoke detectors 214-1, 214-2, . . . , 214-X to the computing device 200 and/or the server 224.

For example, the control panel 216 can transmit the status 218-1, 218-2, . . . , 218-Y of each of the plurality of smoke detectors 214-1, 214-2, 214-X to the computing device 200 via antenna 207. The antenna 207 can be a near-field communication (NFC) antenna. In some examples, the control panel 216 can transmit the location 228-1, 228-2, . . . , 228-Z of each of the plurality of smoke detectors 214-1, 214-2, . . . , 214-X to the server 224 via a network 222.

The network 222 can be distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, network 222 can include a number of servers that receive information from, and transmit information to control panel 216, computing device 200, and server 224 via a wired or wireless network.

The control panel 216 may include a network interface 213 to connect the control panel 216 to the network 222. The server 224 may include a network interface 215 to connect the server 224 to the network 222 and the computing device 200 may also include a network interface 217 to connect the computing device 200 to the network 222. The network interfaces 213, 215, 217 can be ethernet interfaces, Wi-Fi interfaces, long-term evolution (LTE) interfaces, or public switched telephone network interfaces, for example. However, embodiments of the present disclosure are not limited to a particular type(s) of network interfaces.

The server 224 can also include a memory 209 and a processor 211. Memory 209 can store the location 228-1, 228-2, . . . , 228-Z of each of the plurality of smoke detectors 214-1, 214-2, . . . , 214-X. Each of the plurality of locations 228-1, 228-2, . . . , 228-Z can be stored as a latitude and longitude coordinate.

Memory 209 can be any type of storage medium that can be accessed by processor 211 to perform various examples of the present disclosure. For example, memory 209 can be a non-transitory computer readable medium having computer readable instructions (e.g., computer program instructions) stored thereon that are executable by processor 211 to send a request (e.g., a command) to the control panel 216 to send a status 218-1, 218-2, . . . , 218-Y and/or location 228-1, 228-2, . . . , 228-Z of each of the plurality of smoke detectors 214-1, 214-2, . . . , 214-X, receive the status 218-1, 218-2, . . . , 218-Y and/or location 228-1, 228-2, . . . , 228-Z of each of the plurality of smoke detectors 214-1, 214-2, . . . , 214-X, and transmit the status 218-1, 218-2, . . . , 218-Y of each of the plurality of smoke detectors 214-1, 214-2, . . . , 214-X, the location 228-1, 228-2, . . . , 228-Z of each of the plurality of smoke detectors 214-1, 214-2, . . . , 214-X, and/or building information model (BIM) 226 to the computing device 200.

The server 224 can transmit the status 218-1, 218-2, . . . , 218-Y of each of the plurality of smoke detectors 214-1, 214-2, . . . , 214-X, the location 228-1, 228-2, . . . , 228-Z of each of the plurality of smoke detectors 214-1, 214-2, . . . , 214-X, and/or building information model (BIM) 226 to the computing device 200 upon a command, periodically, and/or upon detecting a change in status of a smoke detector of the plurality of smoke detectors 214-1, 214-2, . . . , 214-X, a change in location of a smoke detector of the plurality of smoke detectors 214-1, 214-2, . . . , 214-X, and/or a change in the BIM.

In some embodiments, memory 209 can store the location 228-1, 228-2, . . . , 228-Z of each of the plurality of smoke detectors 214-1, 214-2, . . . , 214-X and the building information model (BIM) 226. Although not shown in FIG. 2, memory 209 can also store the status 218-1, 218-2, . . . , 218-Y of each of the plurality of smoke detectors 214-1, 214-2, . . . , 214-X.

The BIM 226 can include building information including space and fixture information to define a plurality of spaces of the building. For example, the BIM 226 can be a digital building floor plan. In some examples, the BIM 226 can be downloaded to the computing device 200.

The computing device 200, as previously described in connection with FIG. 1, can be used to guide a user to the plurality of smoke detectors 214-1, 214-2, . . . , 214-X and can include a memory 202, a processor 204, a user interface 206, a positioning system 208, an antenna 210, a speaker 212, and a network interface 217. The computing device 200 can be, refer to, and/or include a laptop computer, desktop computer, or mobile device, such as, for instance, a smart phone or tablet, among other types of computing devices. However, embodiments of the present disclosure are not limited to a particular type of computing device. Computing device 200 may be located at the facility, such as, for instance, in a control room or operating room of the facility or may be located remotely from the facility.

Computing device 200 can receive via network interface 217 and/or antenna 210 the BIM 226, location 228-1, 228-2, . . . , 228-Z of each of the plurality of smoke detectors 214-1, 214-2, . . . , 214-X, and status 218-1, 218-2, . . . , 218-Y of each of the plurality of smoke detectors 214-1, 214-2, . . . , 214-X. For example, the status 218-1, 218-2, . . . , 218-Y of each of the plurality of smoke detectors 214-1, 214-2, . . . , 214-X of the facility can be received from the control panel 216 via a near-field communication (NFC) antenna and the location 228-1, 228-2, . . . , 228-Z of each of the plurality of smoke detectors 214-1, 214-2, . . . , 214-X of the facility can be received via the network interface 217. The BIM 226 and the status 218-1, 218-2, . . . , 218-Y and location 228-1, 228-2, . . . , 228-Z of each of the plurality of smoke detectors can be received responsive to a command from the computing device 200 to the control panel 216 and/or the server 224, periodically, and/or upon detecting a change in the BIM 226, a change in a status 218-1, 218-2, . . . , 218-Y of a smoke detector of the plurality of smoke detectors 214-1, 214-2, . . . , 214-X and/or a change in location 228-1, 228-2, . . . , 228-Z of a smoke detectors of the plurality of smoke detectors 214-1, 214-2, . . . , 214-X, for example. Once received, memory 202 can store the BIM 226, the status 218-1, 218-2, . . . , 218-Y of each of the plurality of smoke detectors 214-1, 214-2, . . . , 214-X, and the location 228-1, 228-2, . . . , 228-Z of each of the plurality of smoke detectors 214-1, 214-2, . . . , 214-X.

As described in connection with FIG. 1, memory 202 can be any type of storage medium that can be accessed by processor 204 to perform various examples of the present disclosure. For example, memory 202 can be a non-transitory computer readable medium having computer readable instructions (e.g., computer program instructions) stored thereon that are executable by processor 204 to receive the status 218-1, 218-2, . . . , 218-Y of each of the plurality of smoke detectors 214-1, 214-2, . . . , 214-X, the location 228-1, 228-2, . . . , 228-Z of each of the plurality of smoke detectors 214-1, 214-2, . . . , 214-X, and BIM 226, display, on the user interface 206, the location 228-1, 228-2, . . . , 228-Z of each of the plurality of smoke detectors 214-1, 214-2, . . . , 214-X in the BIM 226, and receive a selection of a displayed smoked detector representing a smoked detector of the facility of the plurality of smoke detectors 214-1, 214-2, . . . , 214-X, and guide a user to the location of the smoke detector of the facility.

The computing device 200 can include a user interface 206. In some embodiments, the user interface 206 can display the location 228-1, 228-2, . . . , 228-Z of each of the plurality of smoke detectors 214-1, 214-2, . . . , 214-X of the facility. The location 228-1, 228-2, . . . , 228-Z of each of the plurality of smoke detectors 214-1, 214-2, . . . , 214-X of the facility can be displayed in the BIM 226, for example. Each respective one of the displayed plurality of smoke detectors can represent a different smoke detector of the plurality of smoke detectors 214-1, 214-2, . . . , 214-X of the facility.

In some embodiments, the user interface 206 can be configured to receive selections. For example, a user can select a displayed smoke detector on the user interface 206. The user interface 206 can guide a user to the location of the smoke detector of the plurality of smoke detectors 214-1, 214-2, . . . , 214-X of the facility represented by the selected smoke detector. The user interface 206 can guide the user from the fire control panel 216 and/or the user's current position to the smoke detector of the plurality of smoke detectors 214-1, 214-2, . . . , 214-X of the facility. The user interface 206 can guide the user to the location of the smoke detector of the plurality of smoke detectors 214-1, 214-2, . . . , 214-X of the facility by displaying directions and/or displaying a route. In some examples, the computing device 200 can include a speaker 212 to broadcast directions instead of or in parallel with the user interface 206 displaying directions and/or displaying a route.

In some examples, the user interface 206 can display data corresponding to the smoke detector of the plurality of smoke detectors 214-1, 214-2, . . . , 214-X of the facility represented by the selected smoke detector. The displayed data can include what zone the smoke detector is in, battery life, link strength, smoke detector sensitivity, smoke detector readings, and the status of the smoke detector, for example.

The user interface 206 can display a smoke detector with a particular symbol, in a particular shade or color, and/or highlighted based on the status of the corresponding smoke detector of the plurality of smoke detectors 214-1, 214-2, . . . , 214-X of the facility. For example, a displayed smoke detector can be highlighted responsive to the corresponding smoke detector of the plurality of smoke detectors 214-1, 214-2, . . . , 214-X of the facility having a faulty status. In some examples, the user interface 116 can display a smoke detector in a first color responsive to the smoke detector of the plurality of smoke detectors 214-1, 214-2, . . . , 214-X of the facility having a properly functioning status, a second color responsive to the smoke detector of the plurality of smoke detectors 214-1, 214-2, . . . , 214-X of the facility having a faulty status, a third color responsive to the smoke detector of the plurality of smoke detectors 214-1, 214-2, . . . , 214-X of the facility having a triggered status, and a fourth color responsive to the smoke detector of the plurality of smoke detectors 214-1, 214-2, . . . , 214-X of the facility having a disabled status.

The particular symbol, particular shade or color, and or highlight of the displayed smoke detector on the user interface 206 can change in responsive to the status of the corresponding smoke detector of the plurality of smoke detectors 214-1, 214-2, . . . , 214-X of the facility changing. For example, the user interface 206 can be configured to change the smoke detector from a first color to a second color responsive to the corresponding smoke detector of the plurality of smoke detectors 214-1, 214-2, . . . , 214-X of the facility going from a faulty status to a properly functioning status.

In some embodiments, the computing device 200 can include a positioning system 208. The positioning system 208 can operate in environments where a global positioning system (GPS) is unavailable or unreliable. These environments, for example inside a facility, can be called GPS denied environments. The positioning system 208 can include geomagnetic positioning and/or inertial positioning to guide a user to a location of a smoke detector of the plurality of smoke detectors 214-1, 214-2, . . . , 214-X of the facility.

Figure 3:
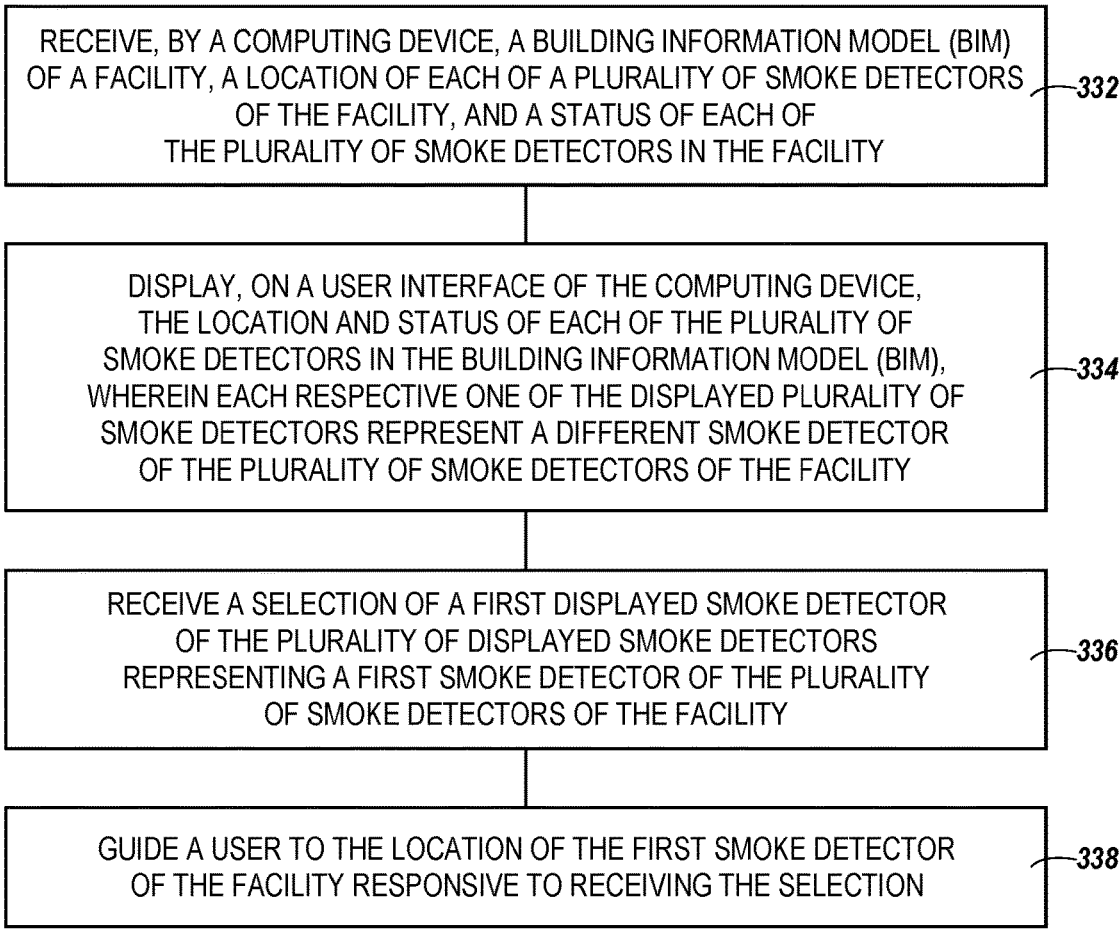
FIG. 3 illustrates an example method of guiding a user to a location of a smoke detector in accordance with an embodiment of the present disclosure.

FIG. 3 illustrates an example method 330 of guiding a user to a location of a smoke detector in accordance with an embodiment of the present disclosure. Method 330 can be performed, for example, by computing device 100 and/or 200 described in connection with FIGS. 1 and 2, respectively.

At block 332, method 330 includes receiving, by the computing device, a building information model (BIM) of a facility, a location of each of a plurality of smoke detectors of the facility, and a status of each of the plurality of smoke detectors in the facility. In some examples, the status of each of the plurality of smoke detectors of the facility can be received from a control panel via a near-field communication (NFC) antenna and the location of each of the plurality of smoke detectors of the facility and the BIM can be received via a network interface from a server. The BIM and the status and location of each of the plurality of smoke detectors can be received responsive to a command from the computing device to the control panel and/or the server, periodically, and/or upon detecting a change in the BIM, detecting a change in a status of a smoke detector, and/or detecting a change in a location of a smoke detector.

At block 334, method 330 includes displaying, on a user interface of the computing device, the location and status of each of the plurality of smoke detectors in the building information model (BIM), wherein each respective one of the displayed plurality of smoke detectors represent a different smoke detector of the plurality of smoke detectors of the facility. In some examples, the user interface can display a smoke detector with a particular symbol, in a particular shade or color, and/or highlighted based on the status of the corresponding smoke detector of the facility.

At block 336, method 330 includes receiving a selection of a first displayed smoke detector of the plurality of displayed smoke detectors representing a first smoke detector of the plurality of smoke detectors of the facility.

At block 338, method 330 includes guiding a user to the location of the first smoke detector of the facility responsive to receiving the selection. In some examples, a positioning system can be used to guide the user. The positioning system can include geomagnetic positioning and/or inertial positioning, for example.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device, comprising:
   a geomagnetic positioning system;
   a user interface;
   a memory; and
   a processor configured to execute instructions stored in the memory to:
   receive a location of each of a plurality of smoke detectors of a facility;
   display the location of each of the plurality of smoke detectors in a building information model (BIM) on the user interface of the computing device, wherein each respective one of the displayed plurality of smoke detectors represents a different one of the plurality of smoke detectors of the facility;

receive, from a user of the computing device via the user interface, a selection of one of the displayed plurality of smoke detectors; and guide, responsive to receiving the selection, the user to the location of the smoke detector of the facility represented by the selected displayed smoke detector using the geomagnetic positioning system of the computing device.

2. The computing device of claim 1, wherein the processor is configured to execute the instructions to guide the user to the location from a current position of the user.

3. The computing device of claim 1, wherein each respective one of the displayed plurality of smoke detectors is displayed with a particular symbol based on a status of the smoke detector of the facility represented by that respective displayed smoke detector.

4. The computing device of claim 1, wherein each respective one of the displayed plurality of smoke detectors is displayed in a particular shade based on a status of the smoke detector of the facility represented by that respective displayed smoke detector.

5. The computing device of claim 1, wherein:
a first one of the displayed plurality of smoke detectors is displayed in a first color responsive to the smoke detector of the facility represented by that respective displayed smoke detector having a properly functioning status;
a second one of the displayed plurality of smoke detectors is displayed in a second color responsive to the smoke detector of the facility represented by that respective displayed smoke detector having a faulty status;
a third one of the displayed plurality of smoke detectors is displayed in a third color responsive to the smoke detector of the facility represented by that respective displayed smoke detector having a triggered status; and
a fourth one of the displayed plurality of smoke detectors is displayed in a fourth color responsive to the smoke detector of the facility represented by that respective displayed smoke detector having a disabled status.

6. The computing device of claim 1, wherein the processor is configured to execute the instructions to:
receive a selection of an additional one of the displayed plurality of smoke detectors; and
guide, responsive to receiving the selection of the additional one of the displayed plurality of smoke detectors, the user to the location of the smoke detector of the facility represented by the additional selected displayed smoke detector using the geomagnetic positioning system of the computing device.

7. The computing device of claim 1, wherein the processor is configured to execute the instructions to display, on the user interface, data corresponding to the smoke detector of the facility represented by the selected displayed smoke detector responsive to receiving the selection.

8. A method for infrastructure-less indoor navigation in a fire control system, comprising:
receiving, by a computing device having an inertial positioning system, a location of each of a plurality of smoke detectors of a facility;
displaying, on a user interface of the computing device, the location of each of the plurality of smoke detectors in a building information model (BIM), wherein each respective one of the displayed plurality of smoke detectors represents a different one of the plurality of smoke detectors of the facility;

receiving, from a user of the computing device via the user interface, a selection of one of the displayed plurality of smoke detectors; and guiding, by the computing device responsive to receiving the selection, the user to the location of the smoke detector of the facility represented by the selected displayed smoke detector using the inertial positioning system of the computing device.

9. The method of claim 8, wherein the method includes guiding the user to the location via the user interface.

10. The method of claim 8, wherein the method includes guiding the user to the location via a speaker of the computing device.

11. The method of claim 8, wherein the method includes receiving, by the computing device, the BIM from a server.

12. The method of claim 8, wherein the method includes:
receiving, by the computing device, a status of each of the plurality of smoke detectors of the facility; and
displaying, on the user interface, the status of each of the plurality of smoke detectors in the BIM.

13. The method of claim 12, wherein the method includes receiving the status of each of the plurality of smoke detectors from a control panel of the facility.

14. The method of claim 8, wherein the method includes guiding the user to the location of the smoke detector of the facility represented by the selected displayed smoke detector without using a global positioning system (GPS).

15. A system for infrastructure-less indoor navigation in a fire control system, comprising:
a plurality of smoke detectors; and
a computing device having a geomagnetic and inertial positioning system, wherein the computing device is configured to:
receive a location of each of the plurality of smoke detectors;
display, on a user interface of the computing device, the location of each of the plurality of smoke detectors in a building information model (BIM), wherein each respective one of the displayed plurality of smoke detectors represents a different one of the plurality of smoke detectors;
receive, from a user of the computing device via the user interface, a selection of one of the displayed plurality of smoke detectors; and
guide, responsive to receiving the selection, the user to the location of the smoke detector represented by the selected displayed smoke detector by broadcasting directions via a speaker of the computing device and by using the geomagnetic and inertial positioning system of the computing device.

16. The system of claim 15, wherein each respective one of the displayed plurality of smoke detectors is displayed in a particular color based on a status of the smoke detector represented by that respective displayed smoke detector.

17. The system of claim 15, wherein each respective one of the displayed plurality of smoke detectors is highlighted or not highlighted based on a status of the smoke detector represented by that respective displayed smoke detector.

18. The system of claim 15, wherein:
the system includes a fire control panel; and
the computing device is configured to receive the location of each of the plurality of smoke detectors from the fire control panel.

19. The system of claim 15, wherein:
the selected displayed smoke detector has a fault; and
the selected displayed smoke detector is displayed in a particular color responsive to the selected displayed smoke detector having the fault.

20. The system of claim 15, wherein the computing device is configured to guide the user to the location of the smoke detector represented by the selected displayed smoke detector by displaying the directions on the user interface in parallel with broadcasting the directions via the speaker.

* * * * *